United States Patent
Pohl et al.

(10) Patent No.: US 9,725,329 B2
(45) Date of Patent: Aug. 8, 2017

(54) PROCESS FOR OBTAINING PRECIPITATED CALCIUM CARBONATE

(71) Applicant: Omya International AG, Oftringen (CH)

(72) Inventors: Michael Pohl, Villach (AT); Christian Rainer, Villach (AT); Gernot Primosch, Villach (AT)

(73) Assignee: Omya International AG, Oftringen (CH)

( * ) Notice: Subject to any disclaimer, the term of this patent is extended or adjusted under 35 U.S.C. 154(b) by 16 days.

(21) Appl. No.: 14/618,399

(22) Filed: Feb. 10, 2015

(65) Prior Publication Data

US 2015/0166358 A1 Jun. 18, 2015

Related U.S. Application Data

(63) Continuation of application No. 13/635,928, filed as application No. PCT/EP2011/054994 on Mar. 31, 2011, now Pat. No. 8,999,284.

(60) Provisional application No. 61/342,017, filed on Apr. 8, 2010.

(30) Foreign Application Priority Data

Apr. 1, 2010 (EP) .................................... 10003665

(51) Int. Cl.
*C01F 11/18* (2006.01)

(52) U.S. Cl.
CPC ............ *C01F 11/181* (2013.01); *C01F 11/18* (2013.01); *C01F 11/182* (2013.01); *C01P 2002/30* (2013.01); *C01P 2004/10* (2013.01); *C01P 2004/62* (2013.01); *C01P 2006/12* (2013.01); *Y10T 428/2982* (2015.01)

(58) Field of Classification Search
CPC .............................. C01F 11/18; C01P 2004/10
IPC .................................................. C01P 2004/10
See application file for complete search history.

(56) References Cited

U.S. PATENT DOCUMENTS

| | | | | |
|---|---|---|---|---|
| 5,833,747 A | * | 11/1998 | Bleakley | ................. C09C 1/021 106/464 |
| 6,022,517 A | | 2/2000 | Fairchild et al. | |
| 6,156,286 A | | 12/2000 | Fortier et al. | |
| 7,735,274 B2 | * | 6/2010 | Constantz | ............... C04B 14/26 106/738 |
| 2003/0213937 A1 | | 11/2003 | Yaniv | |
| 2006/0099132 A1 | * | 5/2006 | Erdman | ................ C01F 11/181 423/432 |

FOREIGN PATENT DOCUMENTS

| | | | |
|---|---|---|---|
| CN | 101570344 | A | 11/2009 |
| EP | 1785397 | A1 | 5/2007 |
| GB | 941900 | A | 11/1963 |
| GB | 2145074 | A | 3/1985 |
| JP | 59223225 | A | 12/1984 |
| JP | 63260815 | A | 10/1988 |
| JP | 1018911 | A | 1/1989 |
| JP | 6418911 | A | 1/1989 |
| JP | 04321515 | | 11/1992 |
| JP | 5116936 | A | 5/1993 |
| JP | 200608003 | A | 2/2006 |
| RU | 2280115 | C2 | 12/2001 |
| WO | 9852870 | A1 | 11/1998 |

OTHER PUBLICATIONS

Park et al. "Studies on the Preparation of Aragonite (I). Formation of Aragonite of Pillar Shape," Journal of the Korean Chemical Society, 1995, vol. 39, No. 7, 578-584, English Abstract.
Gutjahr et al. "Studies of the growth and dissolution kinetics of the CaCO3 polymorphs calcite and aragonite I. growth and dissolution rates in water." Journal of Crystal Growth 158 (1996) 296-309.
Gutjahr et al. "Studies of the growth and dissolution kinetics of the CaCO3 polymorphs calcite and aragonite II. The influence of divalent cation additives on the growth and dissolution rates." Journal Crystal Growth 158 (1996) 310-315.
Zieba, et al. "Constant composition kinetics studies of the simultaneous crystal growth of alkaline earth carbonates; the calcium / strontium system." Journal Crystal Growth 144 (1994) 311-319.
The International Search Report dated May 16, 2011 for PCT Application No. PCT/EP2011/054994.
The Written Opinion of the International Searching Authority dated May 16, 2011 for PCT Application No. PCT/EP2011/054994.
Office Action dated Sep. 27, 2012 for CL 2684-12.
Office Action dated Jan. 16, 2014 for CN 201180016481.X.
Office Action dated Jan. 27, 2015 for EP 11711354.8.
Office Action dated Jul. 12, 2015 for in 2254/MUMNP/2012.
Decision for RU 2012146546/05.
Office Action dated Jun. 10, 2013 for TW 100110017.
Office Action dated Feb. 10, 2017 for TWD 103113190.
Search Report dated Jul. 21, 2010 for EP 10003665.

* cited by examiner

*Primary Examiner* — Stuart Hendrickson
(74) *Attorney, Agent, or Firm* — Amster, Rothstein & Ebenstein LLP

(57) ABSTRACT

The present invention provides a process for preparing a precipitated calcium carbonate product. The process comprises the steps of preparing an aqueous suspension of precipitated calcium carbonate seeds by carbonating a suspension of Ca(OH)$_2$ in the presence of 0.005 to 0.030 moles of Sr, in the form of Sr(OH)$_2$, based upon moles of Ca(OH)$_2$ prior to or during carbonation; forming an aqueous suspension of a precipitated calcium carbonate product by carbonating a slurry of Ca(OH)$_2$ in the presence of 0.5 to 5% by dry weight of the precipitated calcium carbonate seeds, wherein the precipitated calcium carbonate seeds have a D50 that is less than the D50 of the precipitated calcium carbonate product and the precipitated calcium carbonate seeds have an aragonitic polymorph content greater than or equal to the precipitated calcium carbonate product.

11 Claims, No Drawings

PROCESS FOR OBTAINING PRECIPITATED CALCIUM CARBONATE

CROSS-REFERENCE TO RELATED APPLICATIONS

This is continuation of U.S. application Ser. No. 13/635,928, filed Oct. 12, 2012, which is a U.S. national phase of PCT Application No. PCT/EP2011/054994, filed Mar. 31, 2011, which claims priority to European Application No. 10003665.6, filed Apr. 1, 2010 and U.S. Provisional Application No. 61/342,017, filed Apr. 8, 2010, the contents of which is hereby incorporated by reference.

FIELD OF THE INVENTION

The present invention relates to a method for producing a precipitated calcium carbonate and, in particular, a precipitated calcium carbonate product having an increased weight percent of the aragonitic crystal polymorph.

BACKGROUND OF THE INVENTION

In recent years calcium carbonate has found a wide array of uses across many fields. For example, calcium carbonate is one of the most widely used minerals in the paper, plastic, paint and coating industries both as a filler and, due to its white color, as a coating pigment. In the paper industry calcium carbonate is valued for its high brightness, opacity and gloss and is commonly used as a filler to make bright opaque paper. In addition, calcium carbonate is frequently used as an extender in paints and is also used as a filler in adhesives and sealants. High grade calcium carbonate has also found uses in formulations of pharmaceuticals.

Calcium carbonate is known to exist as three types of crystal polymorphs: calcite, aragonite and vaterite. Calcite, the most common crystal polymorph, is considered to be the most stable crystal form of calcium carbonate. Less common is aragonite, which has a discrete or clustered needle orthorhombic crystal structure. Vaterite is the rarest calcium carbonate polymorph and is generally unstable.

Among these three forms, aragonite is particularly useful in a number of applications, such as an inorganic filler or paper coating, due to its needle-shaped crystal structure which offers enhanced paper bulk and opacity. As a result, the demand for calcium carbonate with a significant aragonite crystal content has increased substantially.

Generally, one way to produce calcium carbonate commercially is by calcining crude calcium carbonate to obtain quicklime. Water is then added to yield an aqueous suspension of calcium hydroxide ("milk of lime"), and carbon dioxide is reintroduced into this slurry to precipitate the calcium carbonate. The product of this process is known as precipitated calcium carbonate ("PCC"). The resulting aqueous suspension, or slurry, of calcium carbonate may be used as is or further processed (i.e., dewatered, grinded, etc.) to form a dry product. The precipitation reaction is capable of producing each of the three polymorphs (calcite, aragonite and vaterite) depending on the exact reaction conditions used.

Prior art processes for producing a PCC product with an increased aragonitic crystal content have generally taken a number of approaches. In a first approach, processes have been developed which use additives, such as strontium salts, to promote the production of the aragonitic crystal during carbonation resulting in the formation of PCC. For example, GB 2145074A discloses a process for producing a precipitated aragonite calcium carbonate product by adding strontium chloride ($SrCl_2$) during carbonation to act as an agent in the formation of aragonite crystals.

The use of strontium compounds as additives to the carbonation process for preparing PCC is also disclosed in the PCC production processes of the following Japanese Patent Publications: JP63260815, JP59223225, JP5116936 and JP1018911.

In a second approach, processes have utilized aragonite seed crystals to increase aragonite crystal formation. For instance, GB 941900A teaches a process for producing aragonitic calcium carbonate by introducing a sodium carbonate solution during carbonation. The reference suggests that the addition of aragonite seed crystals, to the disclosed process, may accelerate the production of aragonite crystals.

The production processes discussed above have been shown to marginally increase the total aragonitic crystal content of the PCC product. However, these processes have generally been unable to produce PCC having a total aragonitic content of greater than 60%.

Accordingly, there exists a need for a low cost process for producing precipitated PCC containing increased amounts of the aragonitic polymorph.

BRIEF SUMMARY OF THE INVENTION

The present invention provides a process of producing a low cost PCC-comprising material, wherein greater than 60%, and preferably greater than 70%, relative to the PCC in the PCC-comprising material, is of the aragonitic polymorph. In its general form, the present invention accomplishes these requirements by utilizing a two stage manufacturing process. In the first stage, an aqueous suspension of precipitated calcium carbonate seeds may be formed by carbonating a suspension of $Ca(OH)_2$ in the presence of 0.005 to 0.030, or more preferably, 0.01 to 0.02, moles of strontium, in the form of $Sr(OH)_2$, per mole of $Ca(OH)_2$ prior to carbonation. In the second stage, an aqueous suspension of a precipitated calcium carbonate product may be formed by carbonating a slurry of $Ca(OH)_2$ in the presence of 0.5 to 5% by dry weight of the precipitated calcium carbonate seeds. The precipitated calcium carbonate seeds may have a D50 that is less than the D50 of the precipitated calcium carbonate product and the precipitated calcium carbonate seeds may have an aragonitic polymorph content greater than or equal to the precipitated calcium carbonate product. As will be discussed in the examples below, the product of this two stage process overcomes the deficiencies of prior PCC production processes and yields the desired increase in the total weight percent of the aragonitic polymorph within the final product.

The present invention also provides a precipitated calcium carbonate product prepared by the process of the present invention.

In addition, the present invention provides a material comprising the precipitated calcium carbonate product of the present invention. The material may include, for example, products in which it is desirable to include calcium carbonate as a filler, such as paper, paper products, inks, paints, coatings, plastics, adhesives, building products, foodstuffs, and pharmaceutical products.

Finally, the precipitated calcium carbonate product of the present invention is directed to uses of the product for the manufacture of a material in which it is desirable to use aragonitic PCC as a filler.

Additional objects of the invention will be apparent from the description which follows.

DETAILED DESCRIPTION OF THE INVENTION

As discussed above, PCC is typically manufactured through the carbonation of hydrated lime. In this process, crushed calcium carbonate is first calcined (heated) to form lime (CaO) and carbon dioxide gas ($CO_2$). This reaction is shown in reaction (1):

$$CaCO_3 \rightarrow CaO + CO_2 \qquad (1)$$

The lime is then slaked with water to form calcium hydroxide ($Ca(OH)_2$), or milk of lime, which is shown in reaction (2):

$$CaO + H_2O \rightarrow Ca(OH)_2 \qquad (2)$$

Finally, the calcium hydroxide is combined with carbon dioxide (usually captured during the calcining step) to precipitate calcium carbonate. This carbonation step is shown in reaction (3):

$$Ca(OH)_2 + CO_2 \rightarrow CaCO_3 + H_2O \qquad (3)$$

In accordance with the present invention, a precipitated calcium carbonate product is prepared in a two-stage process. In the first stage, an aqueous suspension (or slurry) of precipitated calcium carbonate seeds is prepared by carbonating a suspension of $Ca(OH)_2$ in the presence of 0.005 to 0.030, or more preferably, 0.01 to 0.02 moles of strontium, in the form of $Sr(OH)_2$, based upon moles of $Ca(OH)_2$ prior to carbonation. The $Sr(OH)_2$ may be introduced via the lime of the suspension of $Ca(OH)_2$ or, more preferably, may be formed in situ by the addition of SrO-comprising minerals during slaking and/or carbonation. Where $Sr(OH)_2$ is formed in situ by the addition of SrO-comprising minerals, the SrO-comprising mineral may be obtained, preferably, by calcining $SrCO_3$-comprising minerals or crude strontianite raw stones.

The precipitated calcium carbonate seeds of the present invention are characterized by an aragonitic polymorph content greater than or equal to the aragonitic polymorph content of the precipitated calcium carbonate product produced in the second stage. Specifically, in the process of the present invention, the aqueous solution of precipitated calcium carbonate seeds may have an aragonitic polymorph content of greater than 85%, preferably, 90% or, most preferably, 95% by dry weight. The dry weight percent, as described herein, is determined by x-ray diffraction analysis (XRD).

The precipitated calcium carbonate seeds produced during the first stage of the manufacturing process are further characterized by a D50 that is less than the D50 of the precipitated calcium carbonate product. The D50 size is defined as the size at which 50% of the product is less than the size based on a cumulative volume fraction. Particle size is measured using a Micrometrics Sedigraph™ 5100.

It is within the confines of the present invention that the seed production process may be subjected to further processing steps, such as performing dewatering, dispersion and/or grinding. In the preferred embodiment the aqueous suspension of precipitated calcium carbonate seeds may be further processed to obtain a D50 of less than or equal to 0.1 to 0.3 μm and a BET SSA of 10 to 30 $m^2/g$. BET, or surface area, is measured on a TriStar 3000 by measuring the nitrogen absorption according to the BET procedure on a dried sample.

With respect to grinding, the PCC seeds obtained in the first stage of the process may be dry ground and/or wet ground. Wet grinding refers to grinding the PCC in a liquid medium (e.g., slurry). Wet grinding may be carried out in the absence of a grinding aid or in the presence of a grinding aid. One or more grinding agents can be included, such as, e.g., sodium polyacrylate, a salt of polyacrylate acid, and/or a salt of a copolymer of acrylic acid. Drying may take place using any suitable drying equipment and can, for example, include thermal drying and/or drying at reduced pressure using equipment such as an evaporator, a flash drier, an oven, a spray drier (such as a spray drier sold by Niro and/or Nara), and/or drying in a vacuum chamber.

In the second stage of the process of the present invention, an aqueous suspension of a precipitated calcium carbonate product is formed by carbonating a slurry of $Ca(OH)_2$ in the presence of 0.5 to 5% by dry weight of the precipitated calcium carbonate seeds obtained from the first stage of the production process. In this regard, the precipitated calcium carbonate seeds may be added to the slurry of $Ca(OH)_2$ prior to carbonation of the precipitated calcium carbonate product. Alternatively, the precipitated calcium carbonate seeds may be added to the slurry of $Ca(OH)_2$ within the first quarter of the total carbonation time, where the total carbonation time includes the total time span measured from the start of carbonation until the time of minimum electrical conductivity.

The process described herein is capable of producing a precipitated calcium carbonate product which contains an aragonitic polymorph content of greater than 60% by dry weight and, preferably, greater than 70% by dry weight as determined by XRD analysis. In addition, the precipitated calcium carbonate product produced in the second stage, preferably, has a total strontium quantity of 1 to 5 mol/dry metric ton.

It is also within the confines of the present invention that the precipitated calcium carbonate product obtained in the second stage may be subjected to further processing, including, for example, dewatering, dispersion and/or grinding steps to obtain a precipitated calcium carbonate product having the desired characteristics. Preferably, the precipitated calcium carbonate product obtained in the second stage may be subjected to additional processing to obtain a D50 of between 0.35 and 0.45 microns and a BET SSA of between 8 and 20 $m^2/g$.

Finally, the aragonitic precipitated calcium carbonate product produced according to the present invention may be used in various materials in which it is desirable to use calcium carbonate as a filler. For example, the aragonitic precipitated calcium carbonate product may be used in pharmaceutical field with products such as medicines, in human or animal foodstuffs, in the papermaking field such as a filler or coating of paper, in water-based or non-water-based paints, in plastics, or in printing inks (e.g., offset printing, rotogravure printing).

Initial Trials

As a starting point, strontiumhydroxide octahydrate ($Sr(OH)_2 \cdot 8H_2O$), which is currently used as an aragonite promoter in a aragonite-PCC ("A-PCC") seed carbonation, was considered. Laboratory trials were conducted to evaluate alternative and more economical sources for $Sr^{2+}$ than $Sr(OH)_2 \cdot 8H_2O$.

In a first trial, a 26% w/w solution of strontium acetate ($Sr(CH_3COO)_2$) was prepared via dissolution of $SrCO_3$ in 25% w/w acetic acid. The strontium acetate was subsequently evaluated as a substitute for $Sr(OH)_2 \cdot 8H_2O$ as a carbonation additive in A-PCC seed manufacturing. Results of this carbonation trial indicated that strontium acetate is less effective compared to $Sr(OH)_2 \cdot 8H_2O$, at same molar addition rate of $Sr^{2+}$ based on milk of lime. In particular, XRD analysis revealed that the aragonite content after seed carbonation had decreased from 97% to 38%, when compared with a $Sr(OH)_2 \cdot 8H_2O$ additive.

Based upon the results of the first trial, in a second trial, chemically pure, precipitated $SrCO_3$ was calcined at 1300° C. for 2 hours to obtain SrO. A-PCC seed carbonation, with addition of 2% SrO (dry/dry CaO) as slaking additive, yielded the same result (97% aragonite) as with 7.5% $Sr(OH)_2 \cdot 8H_2O$ (dry/dry $Ca(OH)_2$). The results of these initial trials are shown in Table 1. A-PCC manufacturing trials using said post-processed A-PCC seeds were also successful and are discussed in the examples below.

TABLE 1

Initial Trials, Carbonation

| | | | |
|---|---|---|---|
| $Sr(OH)_2 \cdot 8H_2O$ | [% w/w on MoL] | | 7.5 |
| $Sr(CH_3COO)_2$ | [% w/w on MoL] | 3.0 | |
| SSA | [m²/g] | 6.2 | 13.2 |
| D50 | [µm] | 2.37 | 0.97 |
| Aragonite | [%] | 38.6 | 97.0 |
| Total Sr in seed | [mol/DMT seed] | 108.0 | 208.7 |

Further, the PCC seeds obtained in the second trial were mineralogically analyzed by state-of-the-art x-ray diffraction. Notably, no crystalline strontium carbonate was detected indicating that all the strontium ions were incorporated as foreign ions in the aragonite crystal lattice. This confirmed that it is not the strontium carbonate which eventually precipitated during the initial nucleation phase that appears to intervene in seed formation, but rather the strontium ions. Based on these findings, the skilled man would have expected that the best results would then be obtained with a highly soluble strontium salt, such as $SrCl_2$. However, as the results discussed further below indicate, $SrCl_2$ does not contribute to A-PCC seed formation as well as $Sr(OH)_2$ (or $Sr(OH)_2$ derived from the addition of SrO to water), even though strontium chloride has a solubility in water of 53.8 g/100 mL (20° C.), whereas strontium hydroxide has a solubility of 1.77 g/100 ml (20° C.).

These results can be illustrated by comparing the prior art processes, which use a single stage carbonation process, to the examples of the present invention which utilize a two stage process. These examples are meant to be merely illustrative and should not be construed to limit in any way the scope of the invention as defined in the claims that follow thereafter.

Table 2 shows a comparison of the aragonite percent obtained by the present invention as compared to those obtained using the prior art processes.

TABLE 2

| | | | A Invention | B Invention | C Invention | D Prior art | E Prior art | F Prior art | G Prior art |
|---|---|---|---|---|---|---|---|---|---|
| A-PCC Seed | Carbonation | $SrCl_2 \cdot 6H_2O$ [% w/w on MoL] | | | | 3.5 | | | |
| | | $Sr(OH)_2 \cdot 8H_2O$ [% w/w on MoL] | | 5.0 | 7.5 | | | | |
| | | SrO [% w/w on MoL] | 1.51 | | | | | | |
| | | SSA [m²/g] | 13.6 | 13.7 | 14.1 | 9.4 | | | |
| | | D50 [µm] | 0.87 | 3.48 | 1.09 | 8.27 | | | |
| | | Aragonite [%] | 97.4 | 96.1 | 97.6 | 61.7 | | | |
| | | Total Sr in seed [mol/DMT seed] | 107.9 | 139.1 | 208.7 | 97.3 | | | |
| | | Total Sr in seed [mol/DMT $Ca(OH)_2$] | 0.01079 | 0.01391 | 0.02087 | 0.00973 | | | |
| | Post-processing | SSA [m²/g] | 17.4 | 20.6 | 22.5 | | | | |
| | | D50 [µm] | 0.23 | 0.22 | 0.21 | | | | |
| | | Aragonite [%] | | 93.8 | 91.5 | | | | |
| A-PCC Product | Carbonation | $SrCl_2 \cdot 6H_2O$ [% w/w on MoL] | | | | | | | 0.07 |
| | | $Sr(OH)_2 \cdot 8H_2O$ [% w/w on MoL] | | | | | 0.1 | 0.2 | |
| | | A-PCC seed [% w/w on MoL] | 2.5 | 2.5 | 2.5 | — | — | — | |
| | | SSA [m²/g] | 8.2 | 10.5 | 9.5 | 8.7 | 7.9 | 7.6 | |
| | | D50 [µm] | 1.75 | 1.82 | 1.54 | 1.42 | 1.7 | 1.56 | |
| | | Aragonite [%] | 87.7 | 77.4 | 77.6 | 53.8 | 46.4 | 49.8 | |
| | | Total Sr in product [mol/DMT PCC] | 1.93 | 2.53 | 3.80 | 2.79 | 5.58 | 1.95 | |
| | Post-processing | SSA [m²/g] | 11.7 | | | | | | |
| | | D50 [µm] | 0.41 | | | | | | |

EXAMPLES

Example 1

Stage 1: A-PCC Seed

160 kg of quicklime CaO (e.g., the quicklime supplied by Mississippi Lime Co., Ste. Geneviève, Mo) was slaked by adding the compound to 1.300 liters of 50° C. tap water in a stirred reactor. Before slaking, 3.2 kg of SrO, obtained by calcination of chemically pure precipitated $SrCO_3$ at 1300° C. for 2 hours, was added to the CaO. The quicklime was slaked for 30 minutes under continuous stirring and the resulting slurry of calcium hydroxide ("milk of lime") was adjusted to 13% solids content via dilution with 60° C. water and was then screened on a 100 μm screen.

The A-PCC seed precipitation was conducted in a 1000 liter baffled cylindrical stainless steel reactor equipped with an gassing agitator, a stainless steel carbonation tube to direct a carbon dioxide/air gas stream to the impeller and probes for monitoring the pH and conductivity of the suspension. 800 liters of the calcium hydroxide suspension obtained in the slaking step above, adjusted to a temperature of 60° C., was added to the carbonating reactor. A gas of 6% by volume of $CO_2$ in air was then bubbled upwards through the slurry at a rate of 100 m$^3$/h for 15 minutes (calculated from start of introduction of the $CO_2$ gas) under a slurry agitation of 1480 rpm. Thereafter, the $CO_2$ volume fraction in the gas was augmented to 24% and the gas flow rate was augmented to 200 m$^3$/h. The $CO_2$ volume fraction and gas flow rate were maintained at this rate until the end of the reaction. During the carbonation, the temperature of the reaction mix was not controlled and was allowed to rise due to the heat generated in the exothermic precipitation reaction. After conductivity reached a minimum corresponding to the total conversion of $Ca(OH)_2$ into PCC, the gassing was continued for another 8 minutes before the introduction of gas was stopped. Carbonation time, calculated from start of gas introduction to the time of minimum conductivity, was 84 minutes. The A-PCC seed slurry was then screened on a 45 μm screen and the screened product was recovered as an aqueous slurry of the A-PCC seed. As shown in Column A of Table 2, A-PCC seed carbonation with the addition of 2% SrO based on dry CaO (corresponding to 1.51% SrO based on dry milk of lime) yielded an A-PCC seed slurry having 97.4% aragonite.

Although not required, in this example, post processing of the A-PCC seed slurry was conducted. In particular, the material was dewatered and grinded to yield particles having an SSA of 17.4 m$^2$/g and a median diameter of 0.23 μm.

Stage 2: A-PCC Product

Slaking and carbonation were performed in the same manner as described in Stage 1 above, except that no SrO was added and 2.5% weight percent (calculated as dry calcium carbonate based on dry weight of calcium hydroxide) of the grinded A-PCC seeds formed in Stage 1 was added to the milk of lime prior to carbonation. Testing conducted on the final A-PCC product indicated that 87.7% of the product was of the aragonitic crystal. In addition, post processing was conducted, as described in Stage 1 above, to yield particles having an SSA of 11.7 m$^2$/g and a median diameter of 0.41 μm.

Example 2

Stage 1: A-PCC Seed

A-PCC seed carbonation was performed in the same manner as described in Example 1 above, except no SrO was added to the CaO prior to slaking. In order to form the A-PCC seed, 5.0% weight percent of $Sr(OH)_2.8H_2O$ (based on the dry weight of calcium hydroxide) was added to the milk of lime prior to carbonation. As shown in Column B of Table 2, A-PCC seed carbonation with the addition of 5.0% $Sr(OH)_2.8H_2O$ yielded an A-PCC seed slurry having 96.1% aragonite.

Although not required, in this example, post processing of the A-PCC seed slurry was conducted. In particular, the material was dewatered and grinded to yield particles having an SSA of 20.6 m$^2$/g and a median diameter of 0.22 μm.

Stage 2: A-PCC Product

Slaking and carbonation were performed in the same manner as described in Stage 1 above, except that no $Sr(OH)_2.8H_2O$ was added and 2.5% weight percent (calculated as dry calcium carbonate based on dry weight of calcium hydroxide) of the grinded A-PCC seed formed in Stage 1 was added to the milk of lime prior to carbonation. Testing conducted on the final A-PCC product indicated that 77.6% of the product was of the aragonitic crystal.

Example 3

Stage 1: A-PCC Seed

A-PCC seed carbonation was performed in the same manner as described in Example 1 above, except that no SrO was added to the CaO prior to slaking. In order to form the A-PCC seed, 7.5% weight percent of $Sr(OH)_2.8H_2O$ (based on the dry weight of calcium hydroxide) was added to the milk of lime prior to carbonation. As shown in Column C of Table 2, A-PCC seed carbonation with the addition of 7.5% $Sr(OH)_2.8H_2O$ yielded an A-PCC seed slurry having 97.6% aragonite.

Although not required, in this example, post processing of the A-PCC seed slurry was conducted. In particular, the material was dewatered and grinded to yield particles having an SSA of 22.5 m$^2$/g and a median diameter of 0.21 μm.

Stage 2: A-PCC Product

Slaking and carbonation was performed in the same manner as described in Stage 1 above, except that no $Sr(OH)_2.8H_2O$ was added and 2.5% weight percent (calculated as dry calcium carbonate based on the dry weight of calcium hydroxide) of the grinded A-PCC seed formed in Stage 1 was added to the milk of lime prior to carbonation. Testing conducted on the final A-PCC product indicated that 77.4% of the product was of the aragonitic crystal.

Comparative Example 1

A-PCC seed carbonation was performed in the same manner as described in Example 1 above, except that no SrO was added to the CaO prior to slaking. In order to form the A-PCC seed, 3.5% weight percent of $SrCl_2.6H_2O$ (based on the dry weight of calcium hydroxide) was added to the milk of lime prior to carbonation. As shown in Column D of Table 2, the process yielded an A-PCC having of only 61.7% aragonite. As discussed above, these results demonstrate that highly soluble strontium salt, such as $SrCl_2$, does not work as well as $Sr(OH)_2$ (or $Sr(OH)_2$ derived from addition of SrO to water) when added at a similar addition rate in moles of strontium per dry metric ton of A-PCC seed, even though strontium chloride has a greater solubility in water than strontium hydroxide.

Comparative Example 2

In a single stage A-PCC process, 0.1% w/w of $Sr(OH)_2.8H_2O$ was added to $Ca(OH)_2$ prior to carbonation. Slaking and carbonation was performed in the same manner as described in Stage 2 of Example 1 above, except that no A-PCC seeds were added and, instead, 0.1% w/w of $Sr(OH)_2.8H_2O$ (based on the dry weight of calcium hydroxide) was added to the milk of lime prior to carbonation. As can be seen in Column E of Table 2, the resultant A-PCC product contained only 53.8% aragonite.

Comparative Example 3

In a single stage A-PCC process, 0.2% w/w of $Sr(OH)_2 \cdot 8H_2O$ was added to $Ca(OH)_2$ prior to carbonation. Slaking and carbonation was performed in the same manner as described in Stage 2 of Example 1 above, except that no A-PCC seeds were added and, instead, 0.2% w/w of $Sr(OH)_2 \cdot 8H_2O$ (based on dry weight of calcium hydroxide) was added to the milk of lime prior to carbonation. As can be seen in Column F of Table 2, the resultant A-PCC product contained only 46.4% aragonite.

Comparative Example 4

In a single stage A-PCC process, 0.07% w/w of $SrCl_2 \cdot 6H_2O$ was added to $Ca(OH)_2$ prior to carbonation. Slaking and carbonation was performed in the same manner as described in Stage 2 of Example 1 above, except that no A-PCC seeds were added and, instead, 0.07% w/w of $SrCl_2 \cdot 6H_2O$ (based on dry weight of calcium hydroxide) was added to the milk of lime prior to carbonation. As can be seen in Column G of Table 2, the resultant A-PCC product contained only 49.8% aragonite.

The present invention's two stage process for producing an A-PCC product utilizing strontium hydroxide provides the high aragonite yield previously unavailable by the prior art processes which merely utilize strontium compounds as an additive during carbonation. Rather, by first producing an A-PCC seed in the presence of strontium hydroxide, an A-PCC product having a greater than 60% aragonite content can consistently be obtained. Moreover, the use of strontium hydroxide, as compared to strontium chloride, significantly increases aragonite crystal growth while reducing manufacturing costs.

Now that various embodiments of the present invention have been described in detail, various modifications and improvements thereon will become readily apparent to those skilled in the art. The present embodiments are therefore to be considered in all respects as illustrative and not restrictive, the scope of the invention being indicated by the appended claims, and all changes that come within the meaning and range of equivalency of the claims are therefore intended to be embraced therein.

The invention claimed is:

1. A product obtained by the process comprising the steps of:
    (a) preparing an aqueous suspension of precipitated calcium carbonate seeds by carbonating a suspension of $Ca(OH)_2$ in the presence of 0.005 to 0.030 moles of Sr, in the form of $Sr(OH)_2$, per mole of $Ca(OH)_2$;
    (b) forming an aqueous suspension of a precipitated calcium carbonate product by carbonating a slurry of $Ca(OH)_2$ in the presence of 0.5 to 5% by dry weight of the precipitated calcium carbonate seeds based on the dry weight of $Ca(OH)_2$; and
    (c) subjecting the precipitated calcium carbonate product formed in step (b) to one or more dewatering, dispersion and grinding steps to obtain a product having an aragonite polymorph content of greater than 85% by dry weight, a total strontium quantity of 0.2 to 15 mol/dry metric ton, a D50 of 0.35 to 0.45 microns, and a BET SSA of 8 to 20 $m^2/g$,
    wherein the precipitated calcium carbonate seeds have a D50 that is less than the D50 of the precipitated calcium carbonate product and the precipitated calcium carbonate seeds have an aragonite polymorph content greater than or equal to the precipitated calcium carbonate product.

2. The product of claim 1, wherein the suspension of $Ca(OH)_2$ in step (a) is carbonated in the presence of 0.01 to 0.02 moles of Sr per mole of $Ca(OH)_2$.

3. The product of claim 1, wherein the $Sr(OH)_2$ in step (a) is formed in situ by the addition of a SrO-comprising mineral.

4. The product of claim 3, wherein the SrO-comprising mineral is obtained by calcinating a $SrCO_3$-comprising mineral.

5. The product of claim 1, wherein the precipitated calcium carbonate seeds prepared in step (a) have a D50 of less than or equal to 0.1 to 0.3 µm and a BET SSA of 10 to 30 $m^2/g$.

6. The product of claim 1, wherein precipitated calcium carbonate seeds formed in step (a) have an aragonitic polymorph content of greater than 90% by dry weight.

7. The product of claim 1, wherein the precipitated calcium carbonate seeds formed in step (a) have an aragonitic polymorph content of greater than 95% by dry weight.

8. The product of claim 1, wherein the precipitated calcium carbonate seeds are added to the slurry of $Ca(OH)_2$ in step (b) prior to carbonation.

9. The product of claim 1, wherein the product obtained in step (c) has a total strontium quantity of 1 to 5 mol/dry metric ton.

10. A material comprising the precipitated calcium carbonate of claim 1.

11. The material of claim 10, which is selected from the group consisting of a paper, a paper product, an ink, a paint, a coating, a plastic, an adhesive, a building product, a foodstuff, and a pharmaceutical product.

* * * * *